US010486566B2

(12) United States Patent
Namboodiri et al.

(10) Patent No.: US 10,486,566 B2
(45) Date of Patent: Nov. 26, 2019

(54) VEHICLE SEAT CUSHION TRIM AND SEAT BELT BUCKLE ARRANGEMENT WITH ELASTIC RETURN (71) Applicant: Adient Luxembourg Holding S.à.r.l., Luxembourg (LU)

(72) Inventors: Narayanan Namboodiri, Novi, MI (US); Gopi K. Mogalturthy, Ann Arbor, MI (US)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 30 days.

(21) Appl. No.: 15/724,322

(22) Filed: Oct. 4, 2017

(65) Prior Publication Data
US 2018/0093597 A1    Apr. 5, 2018

Related U.S. Application Data (60) Provisional application No. 62/404,386, filed on Oct. 5, 2016.

(51) Int. Cl.
*B60N 2/68* (2006.01)
*B60R 22/26* (2006.01)
*B60N 2/30* (2006.01)
B60R 22/02 (2006.01)
B60R 22/18 (2006.01)

(52) U.S. Cl.
CPC .......... *B60N 2/688* (2013.01); *B60N 2/3013* (2013.01); *B60R 22/26* (2013.01); *B60R 2022/021* (2013.01); *B60R 2022/1806* (2013.01)

(58) Field of Classification Search
CPC ... B60N 2/688; B60R 22/26; B60R 2022/021; B60R 2022/1806
See application file for complete search history.

(56) References Cited

U.S. PATENT DOCUMENTS

| 2,480,915 A | * | 9/1949 | George | B64D 25/06 244/122 B |
| 4,133,556 A | | 1/1979 | Glinski | |

(Continued)

FOREIGN PATENT DOCUMENTS

| DE | 102 42 603 A1 | 4/2004 |
| DE | 103 07 859 A1 | 9/2004 |

(Continued)

*Primary Examiner* — Faye M Fleming
(74) *Attorney, Agent, or Firm* — McGlew and Tuttle, P.C.

(57) ABSTRACT

A seat cushion trim assembly cooperates with a seat belt buckle having a flexible web, a seat connection portion for fixing a lower portion of the flexible web to seat location and a buckle fixed to an upper end of the flexible web. The seat cushion trim assembly includes a seat cushion trim and an elastic cord with a loop portion configured to extend around the seat belt buckle intermediate portion, an extensible portion extending from the loop portion to a trim fixation end, and a fastening arrangement fixing the trim fixation end to the seat cushion trim. The extensible portion bridges a distance from the flexible web to the trim and supports the buckle to prevent the buckle from moving out of an operative position, upon pivoting movement of a seat back to a forward position and to restore a buckle position upon a return pivoting movement.

7 Claims, 10 Drawing Sheets (56) References Cited

U.S. PATENT DOCUMENTS

| | | | |
|---|---|---|---|
| 4,229,041 A | 10/1980 | Werner | |
| 4,245,856 A * | 1/1981 | Ziv | B60R 22/32 |
| | | | 280/802 |
| 5,332,261 A | 7/1994 | Siepierski | |
| 5,607,185 A | 3/1997 | Isaji et al. | |
| 6,357,795 B1 | 3/2002 | Krauss et al. | |
| 7,040,704 B2 | 5/2006 | Epaud | |
| 7,845,734 B2 * | 12/2010 | Gomi | B60R 22/26 |
| | | | 280/801.1 |
| 8,308,244 B2 * | 11/2012 | Parker | B60N 2/36 |
| | | | 297/481 |
| 8,628,145 B2 | 1/2014 | Parida et al. | |
| 9,586,558 B2 * | 3/2017 | Storck | B60R 22/26 |
| 2005/0248199 A1 | 11/2005 | Epaud | |
| 2009/0001795 A1 | 1/2009 | Homier et al. | |
| 2015/0054321 A1 * | 2/2015 | Hirako | B60N 2/4221 |
| | | | 297/216.1 |
| 2017/0259777 A1 * | 9/2017 | Shimizu | B60R 22/20 |
| 2018/0126947 A1 * | 5/2018 | Barbat | B60N 2/806 |

FOREIGN PATENT DOCUMENTS

| | | | | |
|---|---|---|---|---|
| DE | 10 2004 010694 A1 | 9/2005 | | |
| DE | 102014017972 A1 * | 6/2016 | | B60R 22/22 |
| JP | 02-095953 A | 4/1990 | | |
| JP | H05-105028 A | 4/1993 | | |
| JP | H07-329711 A | 12/1995 | | |
| WO | 2004/033252 A1 | 4/2004 | | |
| WO | 2005/123468 A1 | 12/2005 | | |

* cited by examiner

VEHICLE SEAT CUSHION TRIM AND SEAT BELT BUCKLE ARRANGEMENT WITH ELASTIC RETURN

CROSS REFERENCE TO RELATED APPLICATIONS

This application claims the benefit of priority of U.S. provisional application 62/404,386 filed Oct. 5, 2016, the entire contents of which are incorporated herein by reference.

FIELD OF THE INVENTION

The present invention relates to vehicle seating in general and more particularly relates to a seat cushion trim arrangement for a vehicle seat as well as to a vehicle seat having such a seat cushion trim arrangement and a seat belt buckle arrangement with features for proper positioning of a seat buckle.

BACKGROUND OF THE INVENTION

Seat buckles may be provided as a flexible webbing seat belt buckle that includes a flexible connection between a seat buckle fixation location and a buckle body at the upper end. This structure allows the buckle body to be moved relative to the seat buckle fixation location, facilitating a connection of the seat belt clasp and the buckle body.

DE 102 42 603 discloses a belt buckle connected to the seat back by a pull cable, which acts upon the belt buckle at a distance from the buckle's pivot axis. The cable is anchored to a lower end section of the belt buckle which extends below the belt buckle's pivot axis. Another end of the cable is anchored to the frame of the seat back to pivot the buckle lower as the seat back is lowered.

Seat belt arrangements are known which raise a pivotable seat belt as the seat back (backrest) is raised from a lowered forward position to a design (use position). DE 103 07 859 discloses an arrangement with a seat back that can be pushed forward onto the seat cushion (seat base). A seat belt buckle arrangement moves forward in synchronization with the seat back and returns when the seat back is returned. A spring may bias the rigid buckle lever in a use position.

DE 10 2004 010694 discloses a seat with a belt buckle which pivots out of a recess during movement of the seat from a non-use position into a use position based on a spring arm connection of the buckle to a pivot. JP 07-329711 discloses a seat with a seat belt buckle that is mounted to rotate forward as a seat back is lowered forward. A rod shaped member rotates the buckle arm forward upon moving the seat back. JP 02-095953 discloses a seat with a seat belt having a buckle connected to a pivot by an arm, with an arrangement for rotating the buckle with rotation of the seat back.

Vehicle seats may be provided that include a seat back (backrest) that pivots forward relative to a seat cushion (seat base). The forward pivot may be for stowage or for easy entry behind the seat. Some vehicle seats provide a forward pivoting movement of the seat back, with a tilting movement of the seat cushion, such that the seat back can lie horizontally or more nearly horizontally. Seat belt arrangements are known which lower a pivotable or flexible seat belt as the seat back (backrest) is lowered forward. U.S. Pat. No. 8,628,145 discloses a seat buckle apparatus with a bracket member coupled to a vehicle seat and a belt buckle portion with an engagement member for engaging the bracket member. As the seat back pivotably moves forward to an almost horizontal position, the backrest almost touches or does touch the top surface of the seat cushion. This seat belt arrangement is provided with a configuration such that the bracket member will prevent the upper end of the belt buckle from contacting the seat back when the seat back is folded down on the seat base.

The pivoting movement of the seat back, with a tilting movement of the seat cushion results in a larger gap at a base region of the vehicle seat between the seat cushion and the seat back. With a flexible webbing seat belt buckle, the buckle can be pushed into a location making it difficult to grasp. The buckle may not return to the intended position, while the seat is returning from folded down or stowed or easy entry position to the design position.

SUMMARY OF THE INVENTION

It is an object of the invention to provide a simple, reliable and easy to manufacture arrangement which interacts with the vehicle seat and interacts with a seat belt buckle arrangement to prevent the seat belt buckle arrangement from extensive movement and particularly to prevent the seat belt buckle arrangement from moving into a region between a seat cushion and lower seat back bracket (lower recliner bracket or B-bracket) or backrest pivot support and from becoming lodged or stuck in a non-use position.

According to the invention, a seat cushion trim assembly is provided for cooperation with a seat belt buckle arrangement (assembly). The seat belt buckle arrangement has a seat belt buckle intermediate portion, such as a flexible web, a seat connection portion, for fixing a lower portion of the flexible web to a seat belt anchor location, and a buckle, fixed to an upper end of the flexible web. The seat cushion trim assembly comprises seat cushion trim and an elastic cord. The elastic cord comprises a loop portion configured to extend around the seat belt buckle intermediate portion, an extensible portion extending from the loop portion to a trim fixation end, and a fastening arrangement fixing the trim fixation end to the seat cushion trim. The extensible portion extends from the loop portion, at the seat belt buckle intermediate portion, to the trim, to bridge a distance from the flexible web (seat belt buckle intermediate portion) to the trim. The extensible portion with loop portion supports the buckle and supports the flexible web to resist movement of the buckle out of an operative position, upon pivoting movement of a seat back to a forward position. The elastic cord assists restoration of the buckle to the operative position, upon pivoting movement of a seat back from the forward position to the operative position.

The fastening arrangement may comprises a sewn thread stitch connection between the trim fixation end of the elastic cord and the seat cushion trim. The elastic cord may be a length of elastic cord or bungee cord, preferably a flat length, which is doubled back to form the loop in cooperation with loop stitching. With this configuration there is a connection of one portion of the elastic cord with another portion of the elastic cord to form the loop. The loop stitching may comprise a box stitching form comprising a rectangular stitch box with diagonal stitch portions inside the rectangular stitch box.

According to another aspect of the invention, a vehicle seat is provided comprising a seat cushion, a seat back, a seat belt buckle assembly and a seat cushion trim assembly according to the invention. The seat belt buckle assembly comprises a flexible web, a seat connection portion for fixing a lower portion of the flexible web to a seat belt anchor location and a buckle fixed to an upper end of the flexible web. The extensible portion is positioned to extend from the loop portion at the seat belt buckle intermediate portion to the trim, to bridge a distance from the seat belt buckle intermediate portion (flexible web) to the trim. This configuration supports the buckle and the flexible web to resist movement of the buckle out of an operative position, upon pivoting movement of a seat back to a forward position, and/or to assist restoration of the buckle to the operative position, upon pivoting movement of the seat back from the forward position to the operative position.

The vehicle seat may have the seat back configured to pivot forward relative to the cushion with the cushion changing inclination relative to a vehicle surface as the seat back pivots forward. A distance from the flexible web to the trim increases as the cushion changes inclination relative to a vehicle surface and as the seat back pivots forward.

According to another aspect of the invention a seat cushion trim assembly is provided for cooperation with a seat belt buckle having a flexible web, a seat connection portion for fixing a lower portion of the flexible web to seat belt anchor location and a buckle fixed to an upper end of the flexible web. The seat cushion trim assembly is formed by a process comprising the steps of: forming a seat cushion trim; forming an elastic cord; forming a loop portion with the elastic cord which is configured to extend around the seat belt buckle intermediate portion and with an extensible portion extending from the loop portion to a trim fixation end; and fastening the trim fixation end to the seat cushion trim with a fastening arrangement, whereby the extensible portion extends from the loop portion at the intermediate portion to the trim.

The seat cushion trim assembly so formed may be provided in combination with a seat cushion frame, a seat back and the seat belt buckle assembly comprising the flexible web. The seat connection portion is fixed at a lower portion of the flexible web to the seat belt anchor location and the buckle is fixed to an upper end of the flexible web. The combination may further be provided by: applying the seat cushion trim assembly to the seat cushion frame; and positioning the loop around the buckle and moving the loop to be positioned around the flexible web to extend the extensible portion to bridge a distance from the flexible web to the trim and to support the buckle and the flexible web to prevent the buckle from moving out of an operative position upon pivoting movement of a seat back to a forward position or to restore the buckle to the operative position upon pivoting movement of a seat back from the forward position to the operative position.

The seat cushion trim arrangement and the seat belt buckle arrangement and the vehicle seat of the invention are particularly useful for vehicle seats that may have relative longitudinal movement (direction of travel movement) of the seat cushion relative to the seat back as the backrest is moved to the folded down or stowed or easy entry position. U.S. Pat. No. 8,628,145 is an example of a vehicle seat with a seat cushion changing angles as the seat back pivots forward. The curved bracket attaches the seat cushion frame to the seat back frame. This forms a pivot for the seat cushion as the seat back rotates about the recliner pivot. The seat allows for the seat back to lie more horizontally when pivoted forward in the folded down or stowed or easy entry position. This produces a larger gap, between the seat cushion and the seat back pivot support, in the folded down or stowed or easy entry position. However, the invention is also applicable to other seats, without the gap size change. This invention is applicable to others seats which have folding kinematics where the belt buckle position needs to be managed. A gap may or may not exist and may or may not change in size. The invention is useful with all vehicle seats in which the belt buckle should be maintained in the intended position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
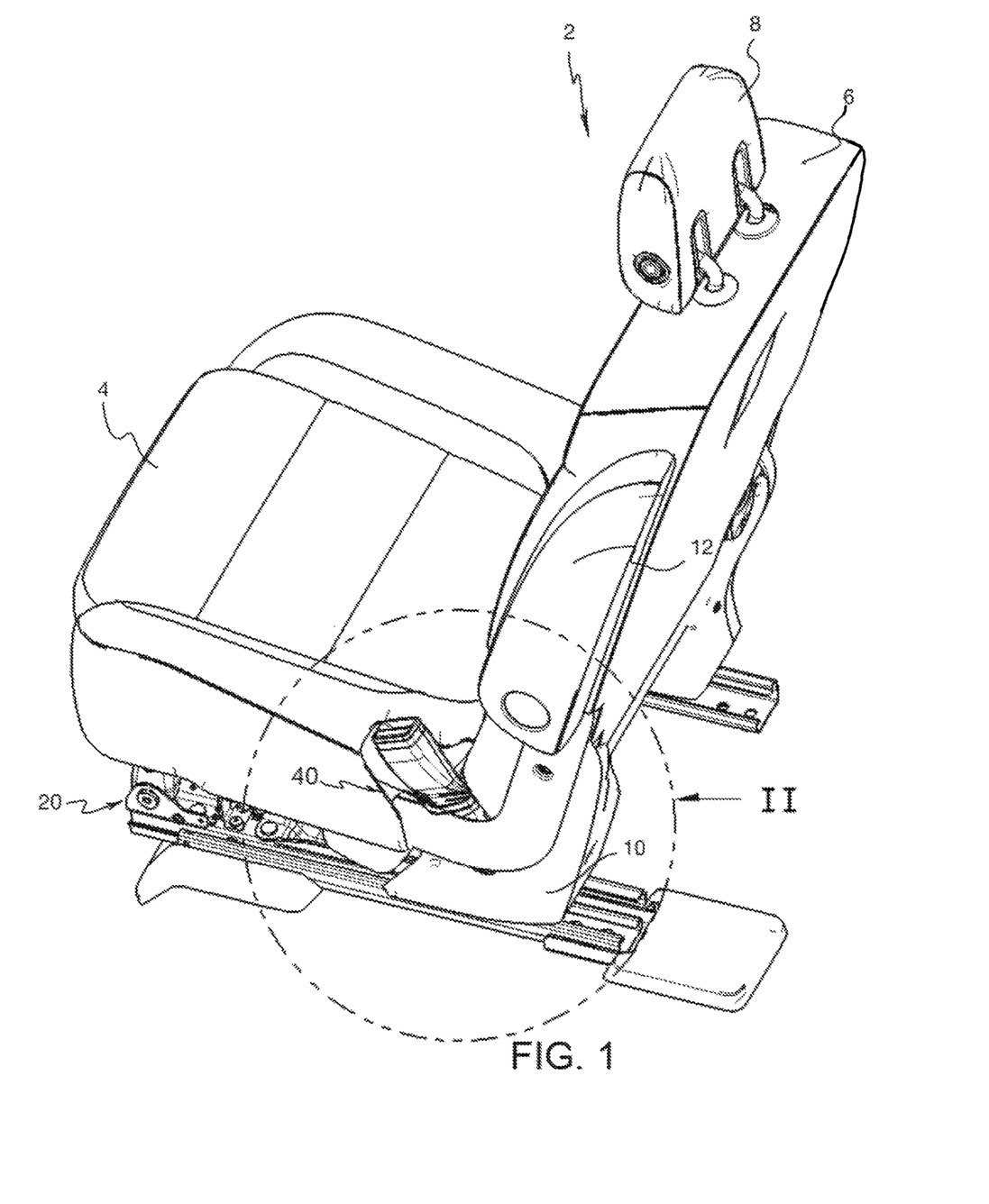
FIG. 1 is an upper perspective view showing a vehicle seat according to the invention, in a design or use position.

Referring to the drawings, FIG. 1 shows a vehicle seat generally designated 2. The vehicle seat 2 comprises a seat cushion (seat base) 4, a seat back (backrest) 6, a headrest 8 and an armrest 12. The vehicle seat 2 also includes a seat back pivot support 10. The vehicle seat 2 is movable with respect to a vehicle floor via a track arrangement generally designated 20.

Figure 6:
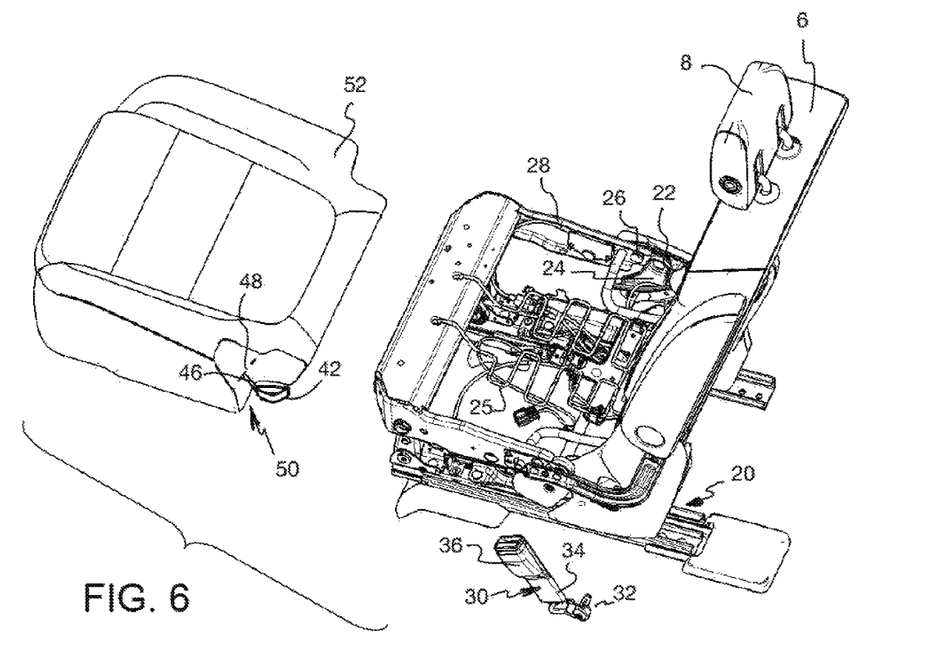
FIG. 6 is an exploded view showing an elastic cord as part of a cushion trim assembly and showing the remainder of the vehicle seat.

The vehicle seat 2 is configured such that the seat back 6 can be pivoted forward, from a design or use position into a forward, or stowed or easy entry position. For this, the seat back 6 is pivotable with respect to the pivot support 10, with the seatback 6 connected to the seat cushion 4 via a bracket 14. The bracket 14 is connected to the seat cushion 4 at a bracket to seat cushion frame connection 16 (FIG. 2) and is connected to the seat back 6 via a bracket to seat back frame pivot connection 18 (FIG. 3). The vehicle seat 2 is further configured such that the forward movement of the seat back 6 results in a change in position and inclination of the seat cushion 4. This is provided by the connection of the bracket 14 via a bracket to link pivot connection 22 to a pivot link 24 as well as the linkage supports of the seat cushion 4. The bracket 14 is also connected to the cushion frame 28 via a bracket to cushion frame pivot connection 26 (FIG. 6). This configuration allows the cushion frame 28 to change position relative to the vehicle when the seat back 6 is pivoted forward. This allows for a flatter or closer to horizontal and advantageous arrangement of the seat back 6 relative to the seat cushion 4 in the forward position of the seat back 6. A similar vehicle seat arrangement for allowing the seat cushion angle to change as the seat back is rotated about a seat back pivot is disclosed in U.S. Pat. No. 8,628,145 (U.S. Pat. No. 8,628,145 is hereby incorporated herein by reference in its entirety).

Figure 2:
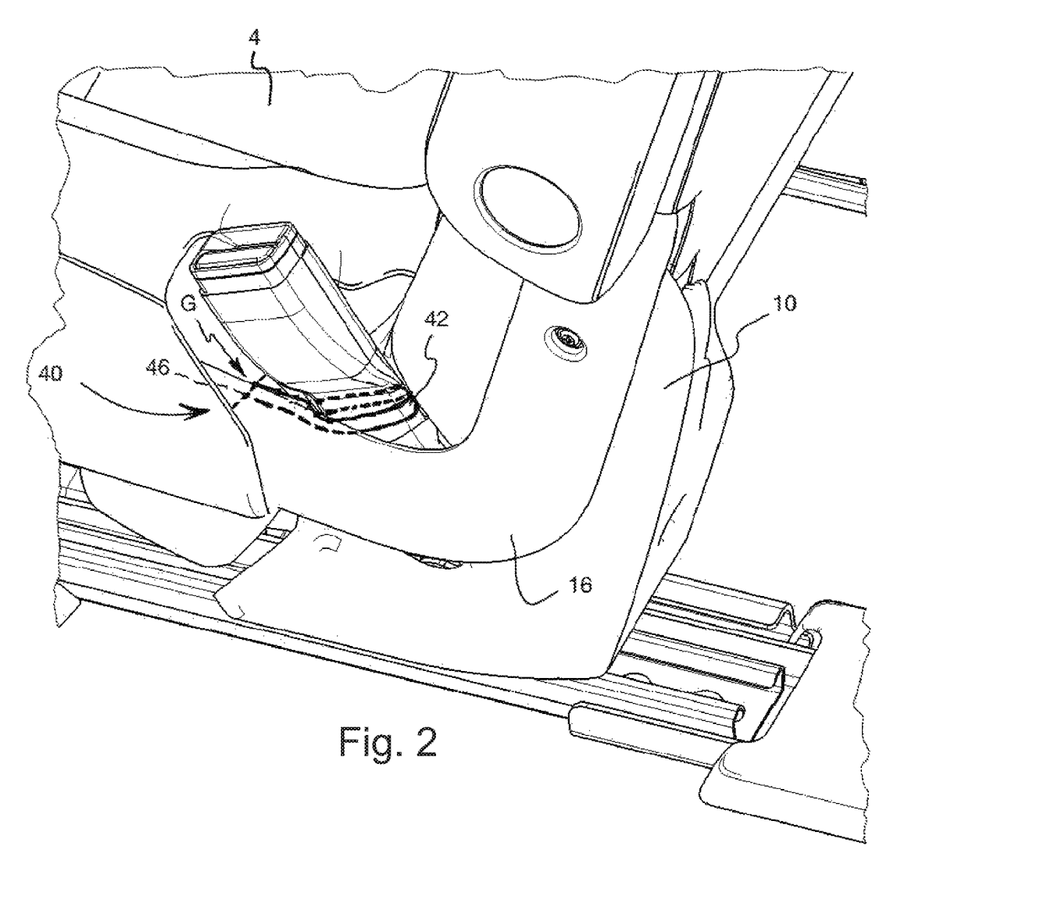
FIG. 2 is a detail broken away view taken from detail II of FIG. 1 and showing a portion of the elastic cord in dashed line, which portion is otherwise hidden from view by a seat bracket.
Figure 3:
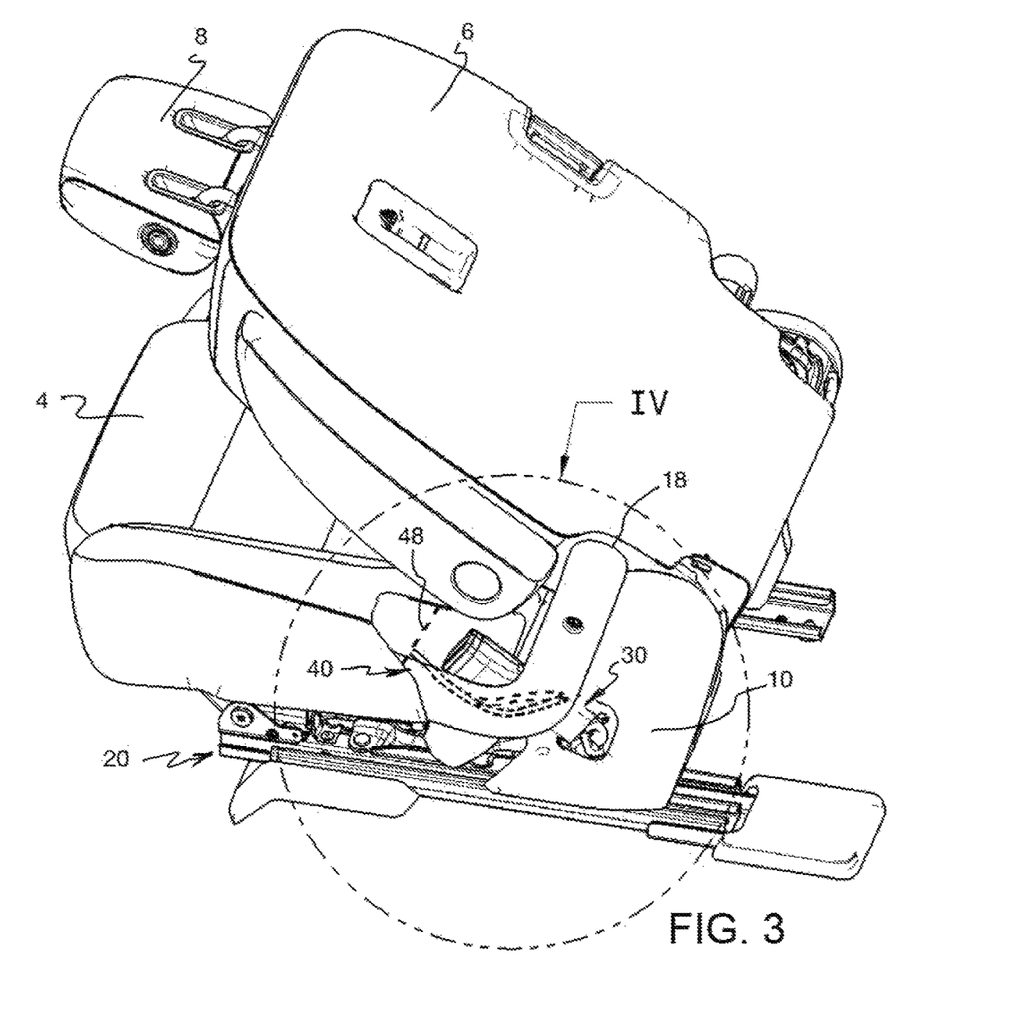
FIG. 3 is an upper perspective view showing the vehicle seat of FIG. 1, in a folded down or stowed position or easy entry position and showing a portion of the elastic cord in dashed line, which portion is otherwise hidden from view by a seat bracket.
Figure 4:
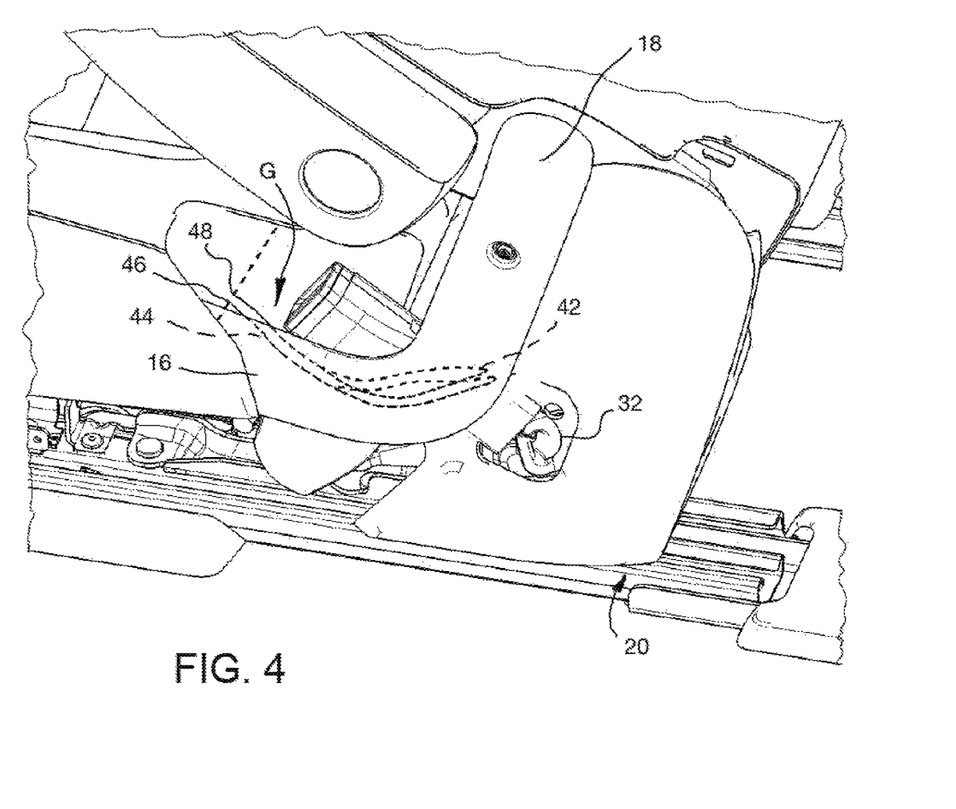
FIG. 4 is a detail broken away view taken from detail IV of FIG. 3.

As shown in FIG. 2, there is a gap G between the seat back support 10 of the seat back 6 and the seat cushion 4, with the seat back 6 in the design position. Because of the relative movements of the seat cushion 4 to the seat back 6 and relative to the pivot support 10, the gap G changes as the seat back 6 pivots forward. As can be seen in FIG. 2, the gap G is smaller with the seat back 6 in the design/use (upright) position than the gap G is in the pivoted forward position as shown in FIG. 4.

The vehicle seat 2 includes a seat belt buckle arrangement generally designated 30. The seat belt buckle arrangement 30 includes a seat belt buckle anchor 32 which fixes or anchors the seat belt buckle arrangement 32 to the vehicle. In the disclosed embodiments of vehicle seat 2 as shown, the seat belt buckle arrangement 30 has the seat belt buckle anchor connection portion 32 fixed to the seat back pivot support 10 (FIG. 3). The seat belt buckle arrangement 30 further includes a flexible web intermediate portion 34 and a seat belt buckle 36. The web 34 is somewhat flexible and allows some movement of the seat belt buckle 36 with the seat belt buckle arrangement 30 fixed to the vehicle seat 2. The seat belt buckle 36 has an expanded dimension relative to the web 34. In particular, the belt buckle 36 has a larger thickness and larger circumferential size relative to the smaller thickness and smaller circumferential size of the web 34.

Figure 5:
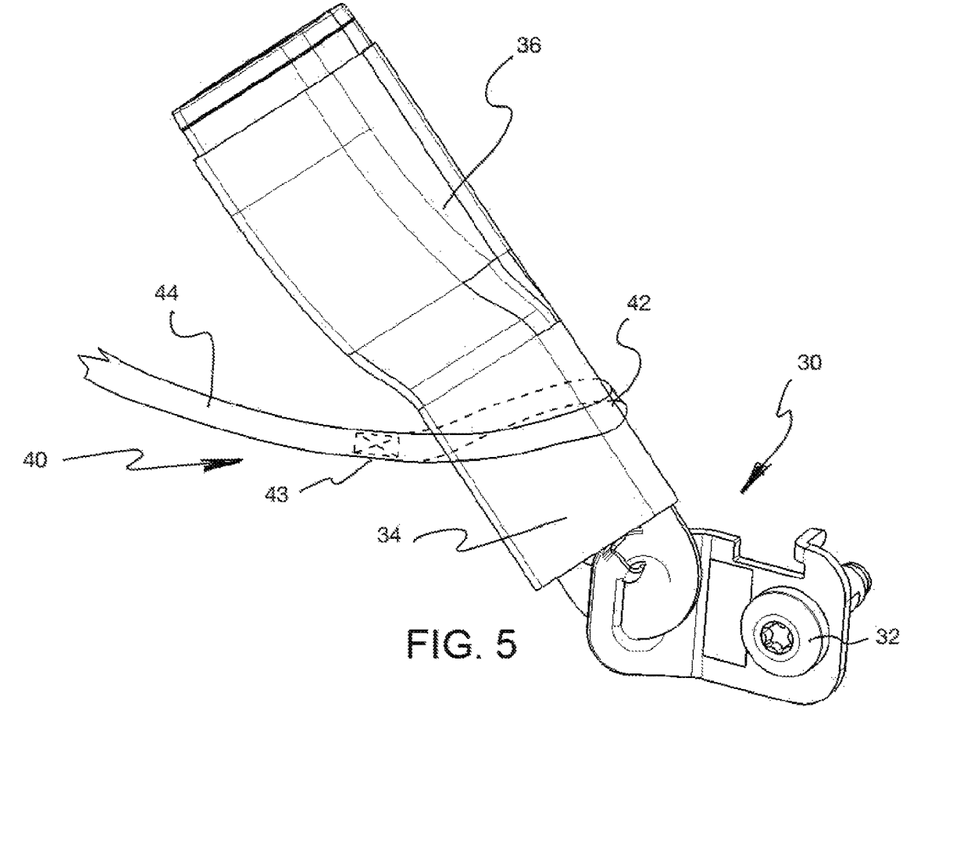
FIG. 5 is a perspective view showing a seat buckle assembly connected to an elastic cord according to the invention.
Figure 7:
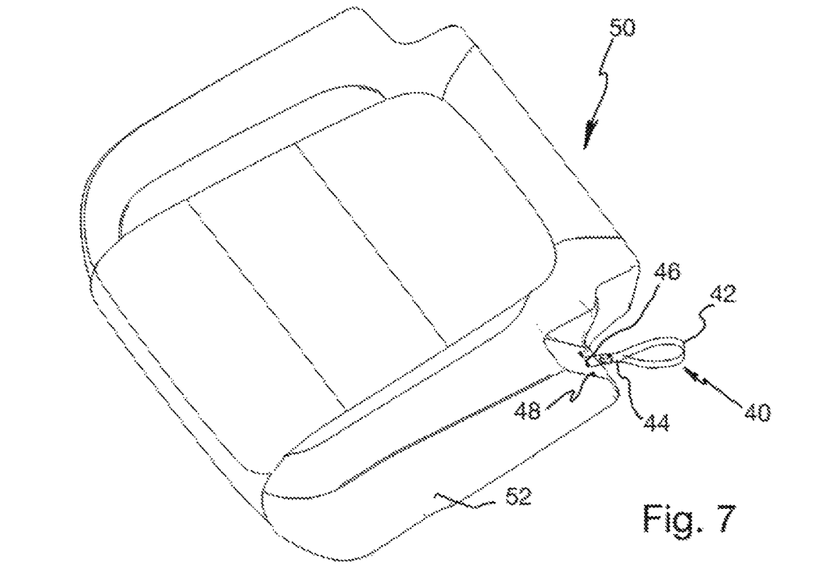
FIG. 7 is a perspective view showing the cushion trim assembly with the elastic cord fixed to the seat cushion trim cover as a part of the cushion trim assembly.
Figure 8:
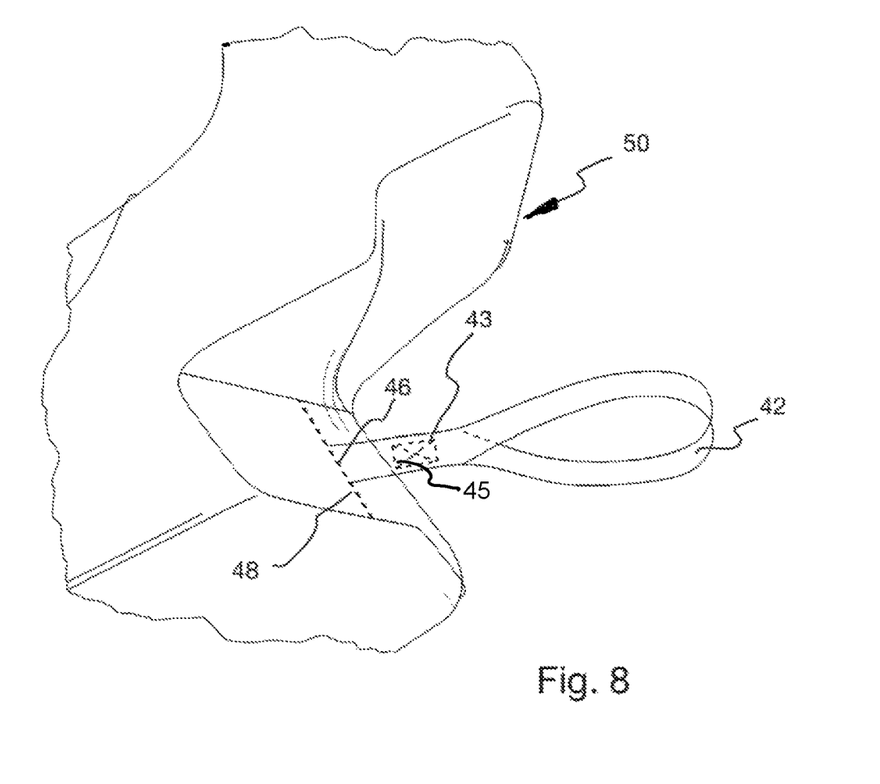
FIG. 8 is an enlarged detail view of a portion of FIG. 7, showing the elastic cord connection to the trim cover and showing the elastic cord extended at the bridging portion and at the loop portion.

As shown in FIG. 5, an elastic cord 40 is provided that connects to and acts on the seat belt buckle arrangement 30. The elastic cord 40 or bungee cord is a fabric and elastic cord that allows a stretching or elongation of the cord and which also applies a biasing force or spring force, with the cord stretched or elongated, biasing or urging the elastic cord 40 back to an initial or a rest position or length. As can be seen in FIG. 5, the elastic cord 40 includes a loop portion 42. This loop portion 42 is formed with the elastic cord 40 being wrapped back on itself and with loop stitching 43 connecting portions of the elastic cord 40 to form the loop portion 42. The elastic cord 40 also includes a bridging portion or extensible portion 44. The bridging portion 44 extends from the loop portion 42 to a cushion trim fixation end 46. In a preferred embodiment, the entire elastic cord 40 is extensible and essentially uniform from the cushion trim fixation end 46 to an opposite end 45, that forms the loop portion 42 at the loop stitching 43 (FIG. 8). The cushion trim fixation end 46 is fastened to cushion trim 52 to form a seat cushion trim assembly 50 (FIG. 7). The elastic cord 40 is fastened to the cushion trim 52 by a fastening arrangement in the form of a sewn thread connection 48. The sewn thread connection 48 provides a sewn thread fixation of the cushion trim fixation end 46 to the cushion trim 52.

The cushion trim 52 may include both a trim cover as well as foam portions. The seat cushion frame 28 includes supporting elements 25 and other features allowing the cushion trim assembly 50 to be positioned above the frame 28 and connected onto the frame 28 (FIG. 6). The loop 42, of the elastic cord 40, is placed around the buckle 36 and is pushed downwardly to position the loop 42 at the flexible web 34. The loop 42 of the elastic cord 40 is not very tight around belt buckle web 34. Some amount (slight amount) of slack makes installation of the loop on the buckle arrangement 30 easier. Even with some slack, the larger thickness (circumferential) size of the buckle 36, relative to the circumference of the web 34, is sufficient to maintain the loop in position, restricted to a region along a length of the web 34.

The elastic cord 40 is sewn to the cover of the cushion trim 52, either during the formation of the trim cover or after the formation of the trim cover. The loop 42 may be formed by another sewing process that provides loop stitching 43 to fix end 46 of the elastic cord 40 to an intermediate portion of the elastic cord 40. The loop stitching 43 is in the form of a rectangular box with diagonal lines inside. In particular, the loop stitching comprises a box stitching form comprising a rectangular stitch box with diagonal stitch portions inside the rectangular stitch box. This is referred to as box stitching. This is used to loop stitch the chord. This is a robust stitching connection that meets high durability requirements. The sewing process that provides the loop stitching 43 may be done prior to fixing the cushion trim fixation end 46 to the trim cover of trim 52. A similar robust stitching form, providing trim to loop portion stitching 48, is used to fix the cushion trim fixation end 46 to the trim cover of trim 52.

FIG. 7 shows the cushion trim assembly 50 with the cushion trim fixation end 46 fixed to the trim cover of the cushion trim 52. In the state shown, the elastic cord 40 may be in a rest or non-extended state. This may be the state upon applying the trim assembly 50 to the seat cushion frame 28 that includes supporting elements 25. FIG. 8 shows the elastic cord 40 positioned and ready to be extended to the belt buckle arrangement 30. The loop portion 42 is next extended such that the bridging portion or extensible portion 44 is extended or somewhat stretched. In the position of the elastic cord 40, shown in FIGS. 1-4, the elastic cord 40 has been stretched so as to pass the loop portion 42 over the buckle 36. This places the loop portion 42 on the seat belt buckle arrangement 30, to be seated or positioned at the web 34.

Figure 9A:
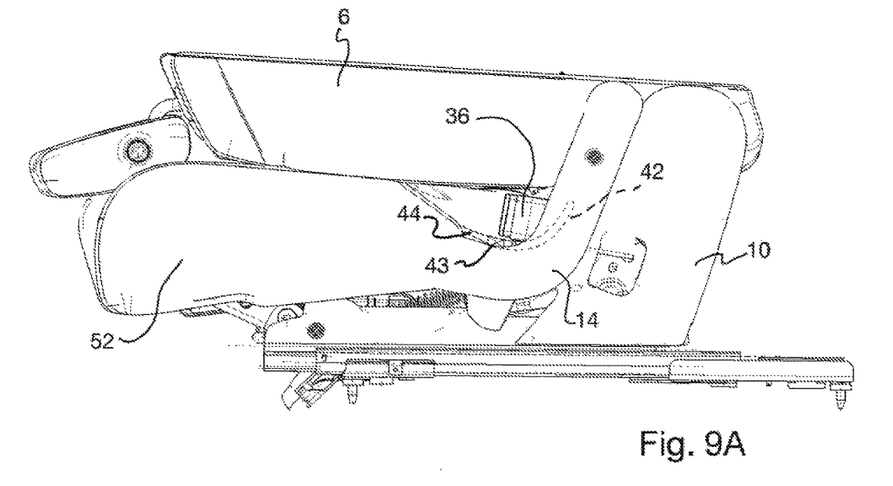
FIG. 9A is a side view showing a folded down position of the seat back and the seat cushion as well as the position of the seat belt buckle.
Figure 9B:
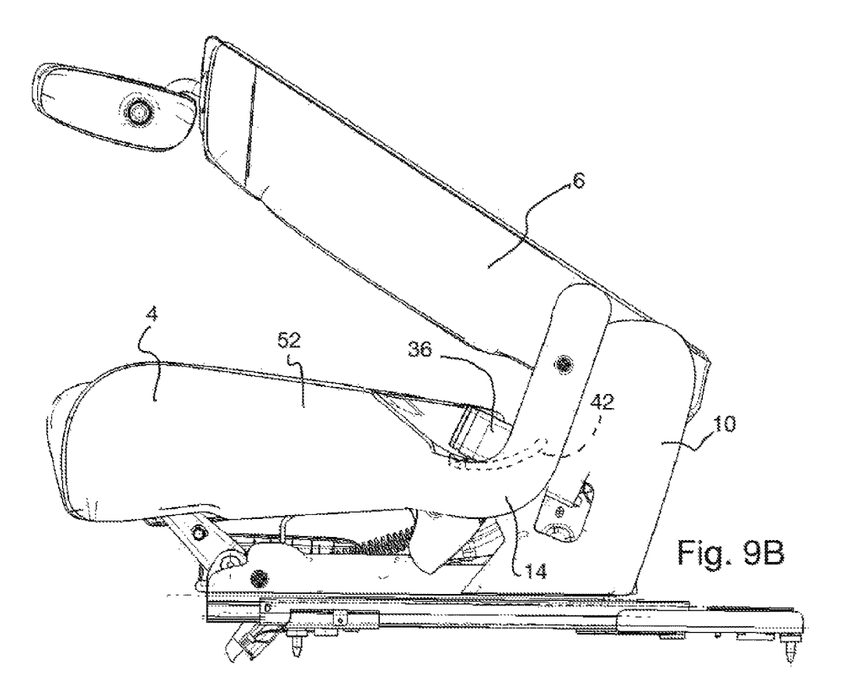
FIG. 9B is a view similar to FIG. 9A, showing a position of the seat back, the seat cushion and the seat belt buckle in an intermediate position, as the seat back returns to the design position.
Figure 9C:
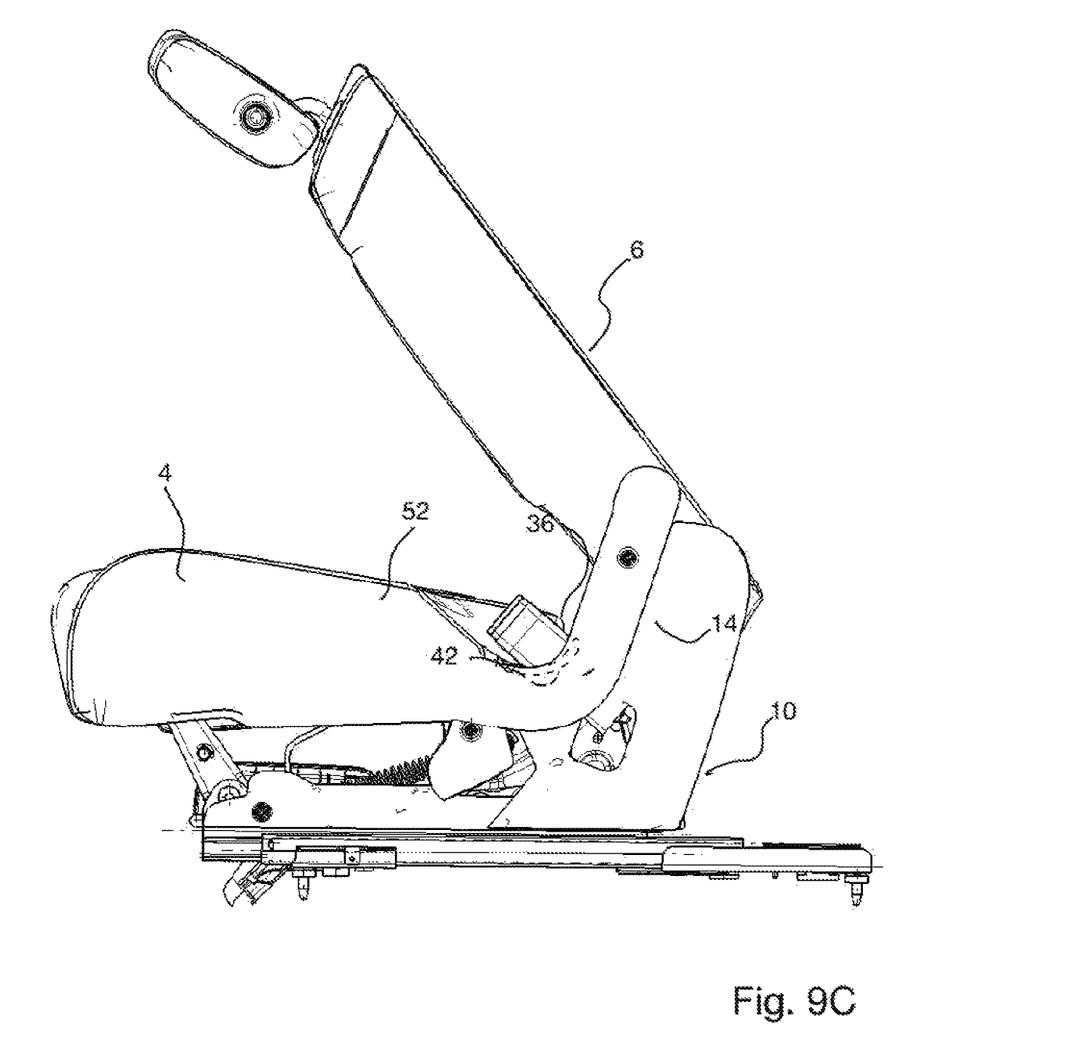
FIG. 9C is a view similar to FIG. 9A, showing a position of the seat back, the seat cushion and the seat belt buckle in a further intermediate position, as the seat back returns to the design position.
Figure 9D:
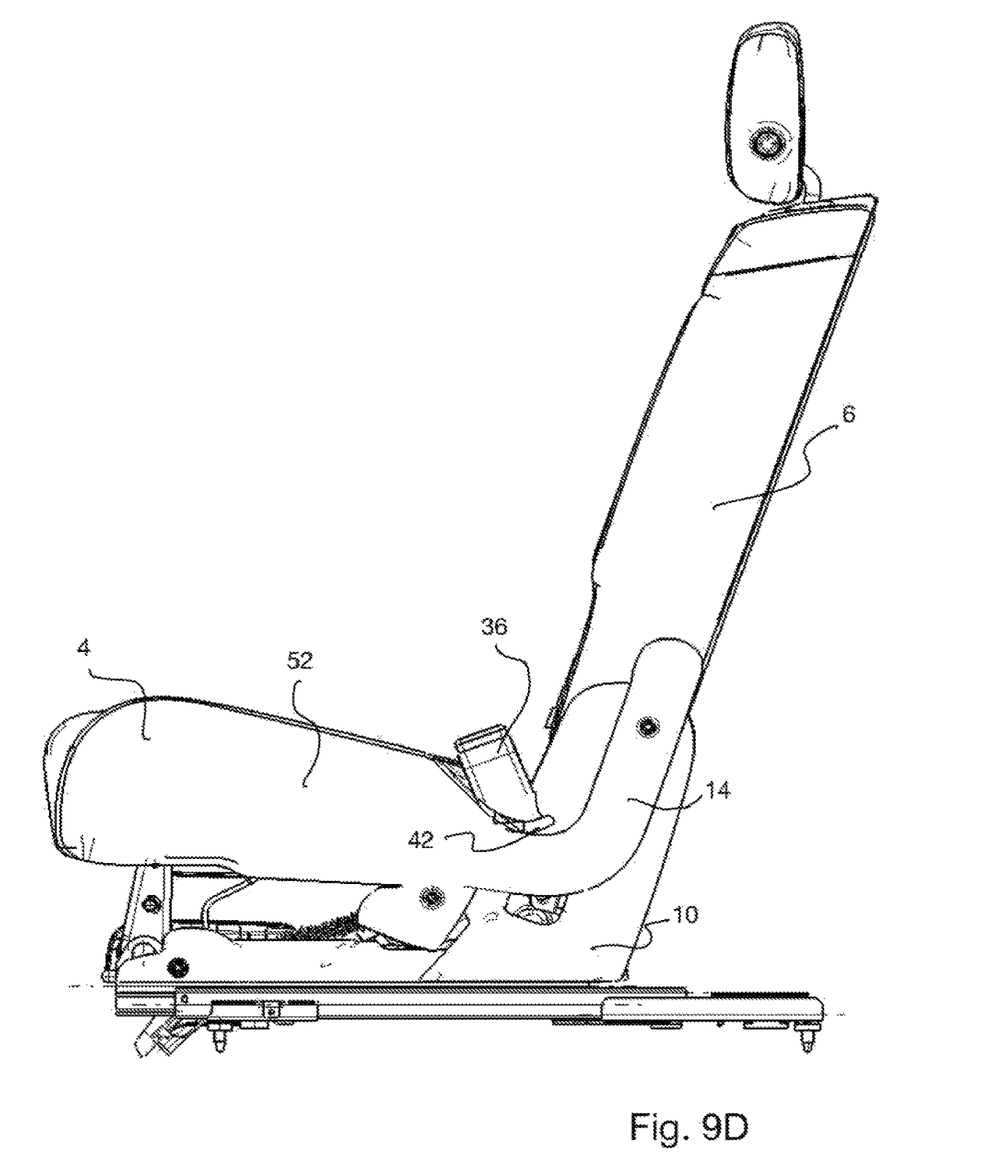
FIG. 9D is a view similar to FIG. 9A, showing a position of the seat back, the seat cushion and the seat belt buckle in the design position.

FIGS. 9A-9D show the position of the buckle 32, as the buckle 32 interacts with the elastic cord 40 as the vehicle seat 2 is changed from the forward, or stowed or easy entry position (FIG. 9A) to the design or use position (FIG. 9D). FIGS. 9A-9D also show the relative position of the seat cushion 4, the pivot support 10 and the seat back 6 during the movement from the forward, or stowed or easy entry position (FIG. 9A) to the design or use position (FIG. 9D). Based on the anchor 32 of the buckle arrangement 30 being fixed to the pivot support 10 and the web 34 being somewhat flexible, with the movement of the seat back 6 into the forward position, there is movement of the web 34 and the buckle 36. Additionally, there is angular movements of the seat cushion 36 and the gap G assumes its widest or largest state. In this folded down position of the seat back 6 the elastic cord 40 is stretched, particularly the bridging portion or extensible portion 44 is fully extended. Based on the fixation locations of the loop portion 42, fixed on the web 34, and the cushion trim fixation end 46, fixed to the trim cover of trim 52, the bridging portion or extensible portion 44 forms a bridge, supporting the buckle 36. Due to the gap G, the buckle 36 would otherwise be movable lower, potentially into the gap G. This could potentially result in the buckle 36 being wedged in the gap or caught by the cushion 4. Even without a seat which causes a gap, the flexible nature of the webbing 34, compared to a rigid buckle which can retain its position by itself, presents the possibility of the lowering of the seat back 6 resulting in the buckle 36 falling off or being pressed too low. The resilient bridging action of the bridging portion or extensible portion 44 of the elastic cord 40, in the position shown in FIG. 9A, when the seat back 6 is folded flat, results in the elastic cord (bungee) 40 stretching and controlling the buckle 36 to resist an extensive change of the position of the buckle 36. In particular, in the position shown in FIG. 9A, the buckle 36 is particularly prevented from being pressed lower—prevented from being pressed into the gap G. The elastic cord 40 bridges the wide gap G that is created during the kinematics of the movement of parts of the seat 2 and prevents the buckle 36 and web 34 from collapsing. The bridging portion or extensible portion 44 supports and holds the buckle 36 in position as shown.

FIG. 9B shows the state as the seat back 6 starts to return from the folded flat position to operative or design position. During this movement of the vehicle seat parts, the buckle 36 is first essentially maintained in the intended position (FIG. 9A) and subsequently, as shown in the progression of FIGS. 9B, 9C and 9D, a restoring force applied by the bridging portion or extensible portion 44, the tension in the elastic cord 40, holds and urges the buckle such that when the seat returns to operative position (FIG. 9D), the buckle is lifted up. The location of the attachment of elastic cord 40, as shown and described, is important in ensuring the belt buckle 36 is returned to the intended position due to the appropriate tension in the elastic cord. In the sequence from FIG. 9A through FIG. 9D the elastic cord 40 pulls the buckle 36 due to the tension created from the extension. When in the design position (FIG. 9D), this tension keeps the buckle 36 in a more upright position compared to the design without elastic cord 40. The elastic cord 40 extends or stretches as the seat 2 is folded to the flat position (FIG. 9A). The tension in the elastic cord 40 is due to the extension of the elastic cord 40, resulting in the holding (support) of the buckle 36 in a controlled position throughout the progression from design position to flat position and in the progression from the flat position to the design position (FIGS. 9A-9D).

While specific embodiments of the invention have been shown and described in detail to illustrate the application of the principles of the invention, it will be understood that the invention may be embodied otherwise without departing from such principles.

LIST OF REFERENCE CHARACTERS 2 vehicle seat
4 seat cushion (seat base)
6 seat back (seat back)
8 headrest
10 seat back pivot support
12 armrest
14 bracket
16 bracket to seat frame connection
18 bracket to seat back pivot connection
20 track arrangement
22 bracket to link pivot connection
24 pivot link
26 bracket to cushion frame pivot connection
28 cushion frame
30 seat belt buckle arrangement
32 seat belt buckle anchor
34 flexible web
36 seat belt buckle
40 elastic cord
42 loop portion
43 loop stitching
44 extensible portion
46 trim fixation end
48 fastening arrangement—sewing thread connection to trim—sewn thread stitch connection
50 seat cushion trim assembly
52 cushion trim cover
G gap of variable size

What is claimed is:

1. A vehicle seat comprising:
a seat cushion;
a seat back;
a seat belt buckle assembly comprising a flexible web, a seat connection portion for fixing a lower portion of the flexible web to a seat belt anchor location and a buckle fixed to an upper end of the flexible web; and
a seat cushion trim assembly comprising:
seat cushion trim; and
an elastic cord comprising a loop portion extending around the seat belt buckle flexible web, an extensible portion extending from the loop portion to a trim fixation end, and a fastening arrangement fixing the trim fixation end to the seat cushion trim, whereby the extensible portion extends from the loop portion at the flexible web to the trim, to bridge a distance from the flexible web to the trim and to support the buckle and the flexible web to resist movement of the buckle out of an operative position, upon pivoting movement of a seat back to a forward position, and to assist restoration of the buckle to the operative position, upon pivoting movement of a seat back from the forward position to the operative position, wherein:
the seat back pivots forward relative to the cushion and the cushion changes inclination relative to a vehicle surface as the seat back pivots forward; and
the distance from the flexible web to the trim increases as the cushion changes inclination relative to a vehicle surface and as the seat back pivots forward.

2. A vehicle seat according to claim 1, wherein the fastening arrangement comprises a sewn thread connection between the trim fixation end of the elastic cord and the seat cushion trim.

3. A vehicle seat according to claim 2, wherein the elastic cord is doubled back to form the loop in cooperation with loop stitching, connecting one portion of the elastic cord with another portion of the elastic cord to configure the loop.

4. A vehicle seat according to claim 3, wherein the loop stitching comprises a box stitching form comprising a rectangular stitch box with diagonal stitch portions inside the rectangular stitch box.

5. A seat cushion trim assembly for cooperation with a seat belt buckle having a flexible web, a seat connection portion for fixing a lower portion of the flexible web to seat belt anchor location and a buckle fixed to an upper end of the flexible web, the seat cushion trim assembly being formed by a process comprising the steps of:

forming a seat cushion trim;

forming an elastic cord;

forming a loop portion with the elastic cord which loop portion is configured to extend around the seat belt buckle intermediate portion and with an extensible portion extending from the loop portion to a trim fixation end; and fastening the trim fixation end to the seat cushion trim with a fastening arrangement, whereby the extensible portion extends from the loop portion at the intermediate portion to the trim, wherein the fastening arrangement is provided by forming a sewn thread stitch connection between the trim fixation end of the elastic cord and the seat cushion trim, and the seat cushion trim assembly is in combination with a seat cushion frame, a seat back and the seat belt buckle assembly, the seat belt buckle assembly comprising the flexible web, the seat connection portion for fixing a lower portion of the flexible web to the seat belt anchor location and the buckle fixed to an upper end of the flexible web and further comprising the steps of:

applying the seat cushion trim assembly to the seat cushion frame;

positioning the loop around the buckle and moving the loop to be positioned around the flexible web to extend the extensible portion to bridge a distance from the flexible web to the trim and to support the buckle and the flexible web to prevent the buckle from moving out of an operative position upon pivoting movement of a seat back to a forward position and to restore the buckle to the operative position upon pivoting movement of a seat back from the forward position to the operative position, wherein:

the seat back pivots forward relative to the cushion and the cushion changes inclination relative to a vehicle surface as the seat back pivots forward; and the distance from the flexible web to the trim increases as the cushion changes inclination relative to a vehicle surface and as the seat back pivots forward.

6. A seat cushion trim assembly according to claim 5, wherein the elastic cord is doubled back to form the loop in cooperation with loop stitching, connecting one portion of the elastic cord with another portion of the elastic cord to configure the loop.

7. A seat cushion trim assembly according to claim 6, wherein the loop stitching comprises a box stitching form comprising a rectangular stitch box with diagonal stitch portions inside the rectangular stitch box.

* * * * *